April 2, 1963     A. S. PAGE     3,083,980
WALKING BEAM ASSEMBLY FOR TANDEM AXLE SUSPENSION
Filed Oct. 16, 1961     2 Sheets-Sheet 1
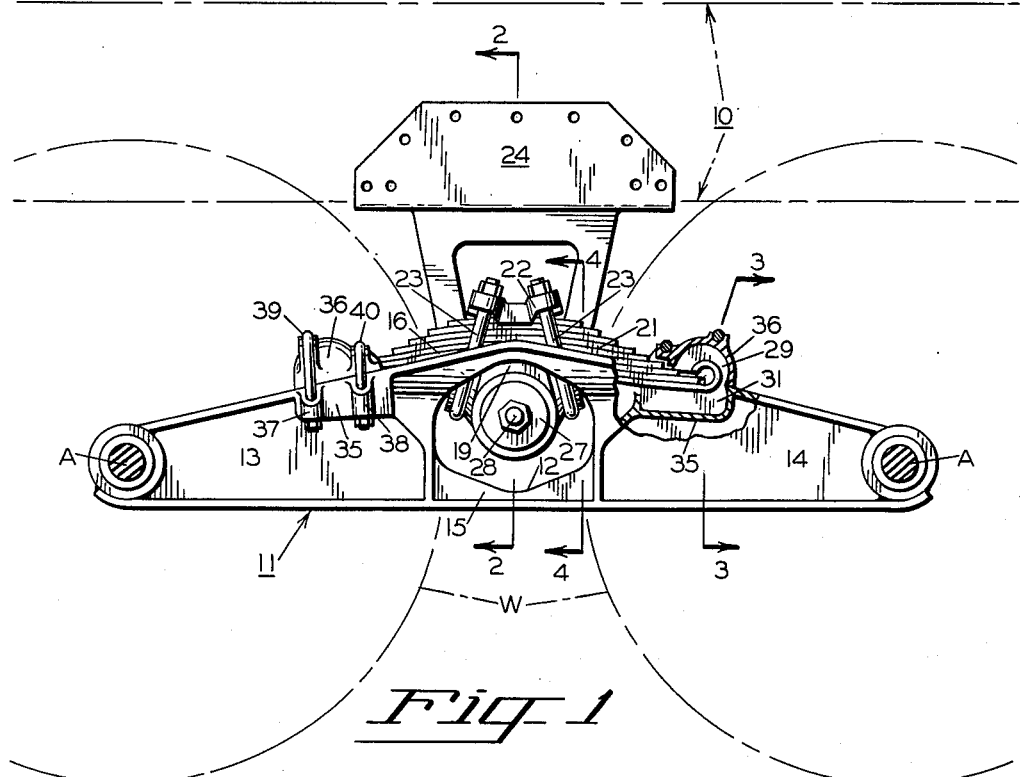
Fig. 1
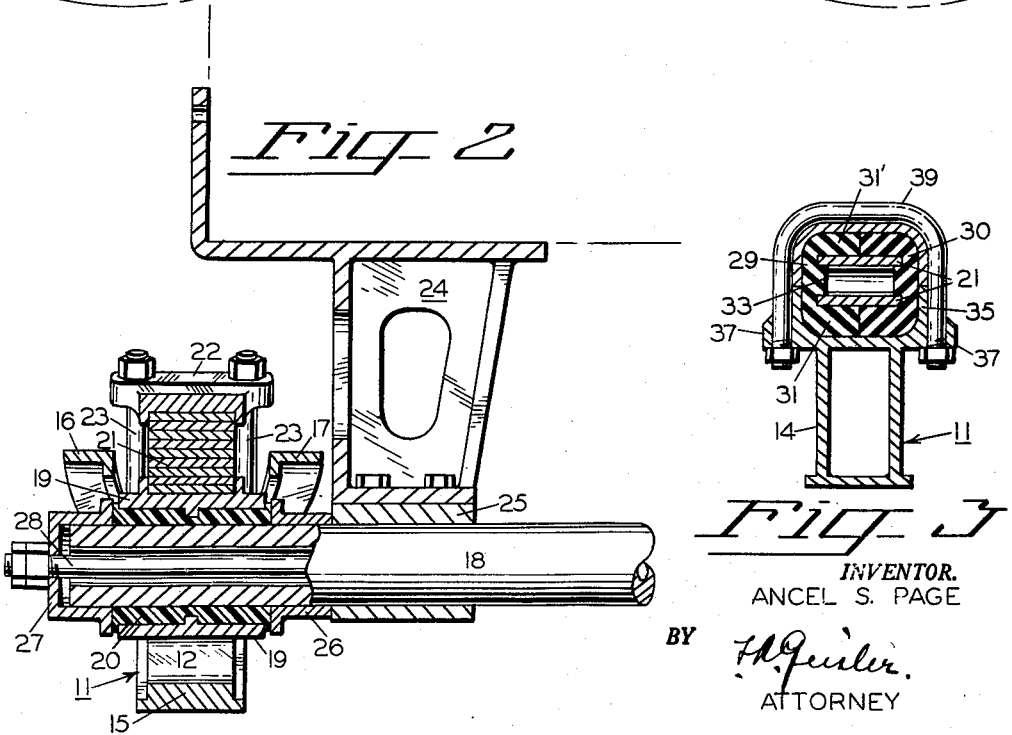
Fig. 2
Fig. 3
INVENTOR.
ANCEL S. PAGE
BY
ATTORNEY April 2, 1963     A. S. PAGE     3,083,980
WALKING BEAM ASSEMBLY FOR TANDEM AXLE SUSPENSION
Filed Oct. 16, 1961     2 Sheets-Sheet 2

INVENTOR.
ANCEL S. PAGE
BY
ATTORNEY

United States Patent Office 3,083,980
Patented Apr. 2, 1963

3,083,980
WALKING BEAM ASSEMBLY FOR TANDEM
AXLE SUSPENSION
Ancel S. Page, Portland, Oreg., assignor to Dura Corporation, Oak Park, Mich., a corporation of Michigan
Filed Oct. 16, 1961, Ser. No. 145,054
5 Claims. (Cl. 280—104.5)

This present invention relates in general to the type of tandem axle vehicle suspension in which a pair of walking beams are mounted at opposite sides of the vehicle with the dual axles mounted in the ends of the walking beams respectively, and in which the walking beams are mounted on the vehicle for rocking motion in substantially vertical and parallel planes through the intermediary of a trunnion shaft in combination with suitable spring means, the trunnion shaft extending transversely with respect to the vehicle frame or chassis.

It has been common practice to a large extent with such tandem or dual axle suspensions to have solid walking beams pivotally mounted on the respective ends of the trunnion shaft and to have the vehicle frame supported on the trunnion shaft by spring means, large leaf springs being customarily employed for this purpose. With such construction the shocks received by the walking beams are transmitted directly to the trunnion shaft and the shocks are then cushioned or partly absorbed by the leaf springs as the shocks are transmitted from the trunnion shaft to the vehicle frame. The common use of relatively large leaf springs in such vehicle suspension involves the problems of spring cost and of spring maintenance and protection against excessive strain.

The object of this invention, like the object of the invention described in my co-pending application for patent, Serial No. 68,960 filed under date of November 14, 1960, entitled "Vehicle Running Gear Assembly for Tandem Axle Suspension," now Patent No. 3,046,036, is to provide an improved vehicle suspension construction in which smaller leaf springs can be used for cushioning the shocks received from the walking beams without any sacrifice in shock absorption, thus enabling such suspension construction to gain the advantage of a saving in the cost and maintenance of smaller leaf springs as compared to the cost and maintenance of the much larger leaf springs heretofore customary with such vehicle suspension.

As stated in my above mentioned co-pending application, I have found that improved shock absorption is obtained in tandem axle vehicle suspension, employing the customary walking beams for the dual axles, if the walking beams are not mounted directly on the trunnion shaft but are mounted through the intermediary of an indirect connection with the trunnion shaft and with the cushioning springs included in such indirect connection. Accordingly a specific object of the present invention is to provide an improved walking beam assembly for a tandem axle vehicle assembly in which the walking beams will support the trunnion shaft through the intermediary of cushioning springs, with the trunnion shaft in turn supporting the vehicle frame. In other words, a specific object of this invention is to have the cushioning springs interposed between the walking beams and the trunnion shaft, instead of being interposed between the trunnion shaft and the vehicle frame, and thus, with such improved assembly construction and arrangement, to cause the shocks to be cushioned earlier in their course from the walking beams to the vehicle frame.

Another specific and important object of the invention is to provide improved cushioning and shock absorbing means in a walking beam assembly wherein a leaf spring, through the intermediary of which the walking beam is connected with the trunnion shaft, is attached at its ends to the walking beam by novel cushioning mountings.

An additional object is to enable such desirable change in the relative location of the cushioning springs to be accomplished in a walking beam assembly for dual axle suspension without requiring an unduly complicated or costly construction.

The manner in which these objects and other incidental advantages are attained, and the manner in which smaller leaf springs in place of the customary larger leaf springs are employed in the attainment of these objects with the present invention, will be briefly described with reference to the accompanying drawings, wherein:

FIG. 1 is a side elevation of the improved walking beam assembly with the mounting for one of the ends of the leaf spring on the walking beam shown in section for clarity;

FIG. 2 is a fragmentary section on line 2—2 of FIG. 1, drawn to a larger scale;

FIG. 3 is a fragmentary section on line 3—3 of FIG. 1, drawn to the same scale as FIG. 2;

Figure 4:
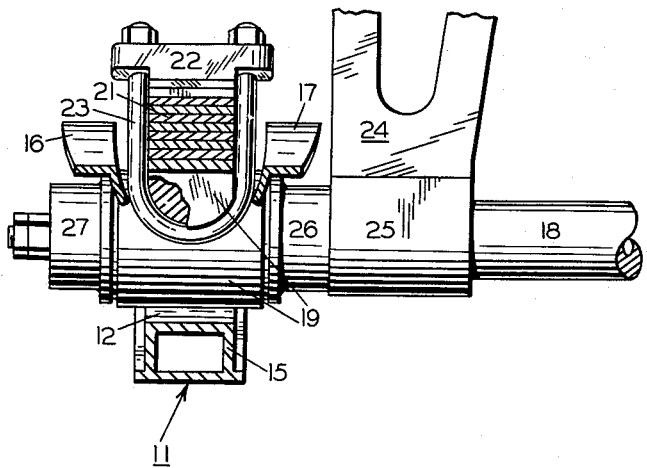
FIG. 4 is a fragmentary section on line 4—4 of FIG. 1, drawn to the same scale as FIG. 2.

In FIGS. 1, 2 and 4 of the accompanying drawings only one of the two walking beam assemblies is shown, but it is to be understood of course that the vehicle has a pair of walking beam assemblies, one on each side, and that both assemblies are necessarily identical. It will suffice for this description therefore to describe only one of the walking beam assemblies.

Referring first to FIG. 1, wherein a portion of the vehicle frame is indicated by the broken lines at 10 and the near side wheels are indicated by the broken lines W, the tandem axles A, A for the wheels are secured to the respective ends of a pair of walking beams located on opposite sides of the vehicle, only the near side walking beam being shown in FIG. 1 and being indicated in general by the reference 11.

Each walking beam is formed with a central aperture 12 and with end portions 13 and 14 at opposite sides of this central aperture. The end portions 13 and 14 are joined by an integral web 15 below the aperture 12 and by a pair of upper integral ribs 16 and 17 (see also FIGS. 2 and 4) above the aperture 12, these ribs being upwardly and outwardly bowed, as shown in the drawings. The purpose of the apertures 12 in the two walking beams is to allow ample clearance for the ends of the trunnion shaft 18 (FIG. 2), which ends extend through the walking beam apertures, and the apertures 12 are large enough to permit necessary relative movement between each walking beam and the corresponding end of the trunnion shaft without liklihood of actual direct contact between trunnion shaft and the walking beam, as presently apparent.

A hub spring seat 19 extends around each end of the trunnion shaft 18 within each walking beam aperture 12. A rubber bushing 20 (FIG. 2) is interposed between the inner cylindrical face of this spring seat 19 and the trunnion shaft 18. A leaf spring 21 is clamped at its center on each of the seats 19 by a pair of U-shaped clamping bolts 23 which extend around lugs on opposite sides of the spring seat 19 and extend through a top clamping cap 22 on the leaf spring. The ends of each leaf spring 21 are attached to the corresponding walking beam in the manner now to be described.

Each leaf spring is formed with its two ends identical, one of the ends of leaf spring 21 being shown in full on the right in FIG. 1. Each end of the leaf spring is mounted in a pair of cooperating cushioning mounting members or blocks 29 and 30 (see also FIG. 3) of rubber, or other similarly suitable resilient material. The blocks 29 and 30 in each pair are identical except for the fact that they are so formed as to be oppositely positioned, as apparent, so as to cooperate in forming a composite cushioning mounting for the spring end. Thus it will suffice to describe one of these mounting blocks 29, which is shown by itself in FIGS. 5, 6 and 7.

Figure 5:
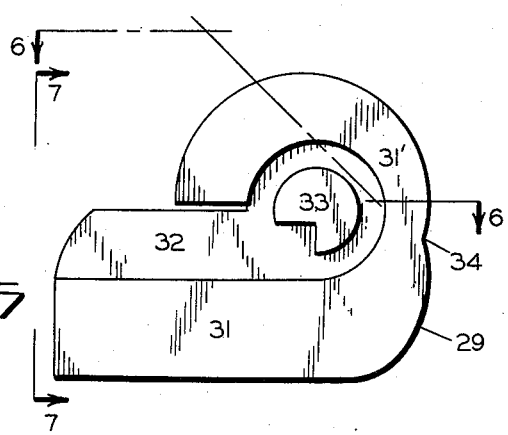
FIG. 5 is a side elevation of one of the pair of cushioning mounting members through the intermediary of which each end of the leaf spring is connected to the walking beam, the view being taken from the inside face of the cushioning mounting member and drawn to a still larger scale.
Figure 6:
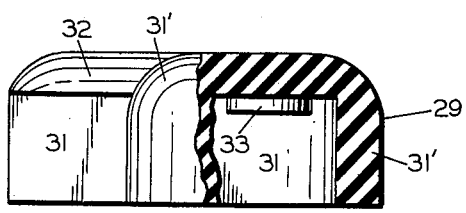
FIG. 6 is a partial plan view and a partial section of the cushioning mounting member of FIG. 5, taken on line 6—6 of FIG. 5 and drawn to the same scale as FIG. 5.
Figure 7:
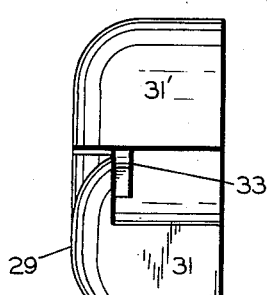
FIG. 7 is an inner end elevation of the same cushioning mounting member taken on line 7—7 of FIG. 5, also drawn to the same scale as FIG. 5.

Referring to FIGS. 5, 6 and 7, as well as FIGS. 1 and 3, the mounting block 29 has a lower spring supporting portion 31, the width of which is approximately half the width of the lower spring leaf and on which the end of the lower spring leaf rests. The end of the lower leaf of the spring is formed into a substantially circular upwardly and reversely curving loop as shown in FIG. 1. The lower spring supporting portion 31 of the mounting block continues into an upwardly and reversely curving portion 31' which extends around on the end loop of the bottom leaf. The block has an outer side wall 32 extending over the corresponding side of the spring end, and this side wall preferably, although not necessarily, has an inwardly extending boss 33, shaped substatnially as shown in FIG. 5, adapted to extend a short distance into the open loop formed by the bottom leaf of the spring. Also preferably the rear outer surface of the block is formed with a slight indentation 34 (FIG. 5) to enable the block to accommodate itself more to the longitudinal expansion of the spring.

Thus the pair of cooperating blocks 29 and 30, when placed together over an end of the leaf spring, form a resilient enclosure on all sides for the spring end (see FIG. 3).

Each of the end portions 13 or 14 of the walking beam 11 is formed with a top integral well or open compartment 35 (FIGS. 1 and 3) of the proper size to contain the bottom halves of the pair of blocks 29 and 30. A cooperating cap 36, which is clamped over the top of the compartment completes the housing confining the pair of blocks 29 and 30 which in turn resiliently house and confine the end of the leaf spring. Thus each end of the leaf spring is secured to the walking beam by a composite resilient mounting. The two side walls of the compartment are each formed with a pair of ears 37 and 38 through which the bottom ends of clamping U-bolts 39 and 40 respectively extend.

A support bracket or inboard leg 24 is secured to each side of the vehicle frame 10. A trunnion shaft bearing member 25 (FIG. 2) is secured to the bottom of each support bracket 24. A spacer washer 26 is mounted on the trunnion shaft between the bearing member 25 and the inner end of the adjacent rubber bushing 20 of the seat 19 on that end of the trunnion shaft for the corresponding leaf spring 21. A compression cap 27 on the end of the trunnion shaft engages the opposite or outer end of the rubber bushing 20. A compression rod 28, extending through the tubular trunnion shaft, holds the compression caps 27 on the opposite ends of the trunnion shaft against the outer ends of the rubber bushings for the respective seats for the springs for the two walking beam assemblies.

With the employment of this walking beam assembly all shocks received by the walking beam are transmitted first to the leaf spring, then to the trunnion shaft, and finally, through the supporting bracket 24, to the vehicle frame. The cushioning of the shocks takes place before they are transmitted to the trunnion shaft, instead of having such cushioning occur after transmission of the shock to the trunnion shaft, the latter being the customary arrangement as previously mentioned. By cushioning the shocks earlier along their course to the vehicle frame the cushioned shock must travel further than when the cushioning takes place between the trunnion shaft and the vehicle frame. Furthermore this improved walking beam assembly enables smaller leaf springs to be used for providing the desired shock absorption, thus giving the advantage of a saving in cost and maintenance of smaller leaf springs as compared to larger leaf springs.

I claim:

1. In a tandem axle vehicle suspension, a pair of rigid walking beams on opposite sides of the vehicle respectively, a pair of tandem axles supporting said walking beams and secured to the ends of said walking beams respectively, a leaf spring centrally mounted on each walking beam, said leaf springs being of considerably shorter length than said walking beams, the ends of each leaf spring attached to the corresponding walking beam at points between the middle of the walking beam and the ends of the walking beam respectively, a trunnion shaft, means for supporting the vehicle frame on said trunnion shaft, and means for supporting the ends of said trunnion shaft on the middle portions of said leaf springs respectively.

2. In a tandem axle vehicle suspension, a pair of rigid walking beams on opposite sides of the vehicle respectively, a pair of tandem axles supporting said walking beams and secured in the ends of said walking beams respectively, each walking beam being provided with a central opening, a leaf spring centrally mounted above each walking beam and positioned in the same vertical plane as the walking beam, said leaf springs being of considerably shorter length than said walking beams, the ends of each leaf spring attached to the top of the corresponding walking beam at points between the middle of the walking beam and the respective ends of the walking beam, a trunnion shaft, the ends of said trunnion shaft extending through said openings in said walking beams respectively, means for supporting the vehicle frame on said trunnion shaft, and means for securing said trunnion shaft to the middle portions of said leaf springs.

3. In a tandem axle vehicle suspension, a pair of rigid walking beams on opposite sides of the vehicle respectively, a pair of tandem axles supporting said walking beams and secured in the ends of said walking beams respectively, a leaf spring centrally mounted above each walking beam and positioned in the same vertical plane as the walking beam, said leaf springs being of considerably shorter length than said walking beams, the ends of each leaf spring attached to the top of the corresponding walking beam at points between the middle of the walking beam and the respective ends of the walking beam, a pair of housings secured on each walking beam between the middle portion of the walking beam and the respective ends of the walking beam, the ends of each of said springs extending into said housings respectively, resilient bearings for said ends of said springs secured in said housings and enclosing said spring ends, a trunnion shaft, means for supporting the vehicle frame on said trunnion shaft, and means for securing said trunnion shaft to the middle portions of said leaf springs.

4. In a tandem axle vehicle suspension, a pair of walking beams at opposite sides of the vehicle respectively, each of said walking beams provided with a center opening, a trunnion shaft, the ends of said trunnion shaft located within said openings in said walking beams respectively and spaced from the walls of said openings, a leaf spring on each walking beam extending over said opening and having its ends supported on the top of the walking beam on opposite sides of said opening respectively, a clamping assembly at the central portion of each of said springs, said clamping assemblies extending down into said openings in said walking beams respectively, said clamping assemblies secured to the ends of said trunnion shaft respectively, means for supporting the vehicle frame on said trunnion shaft, and tandem axles carrying the respective ends of said walking beams.

5. The combination set forth in claim 4 with the addition of pairs of integral spaced ribs at the top of each walking beam extending over said opening in the walking beam, the spring on each walking beam being positioned between the pair of ribs, and with each clamping assembly extending down between the pair of ribs to the corresponding end of said trunnion shaft.

References Cited in the file of this patent

UNITED STATES PATENTS

| | | |
|---|---|---|
| 1,463,655 | Masury | July 31, 1923 |
| 1,877,970 | Reid | Sept. 20, 1932 |